United States Patent
Pilney

(10) Patent No.: US 10,188,092 B2
(45) Date of Patent: Jan. 29, 2019

(54) BREAKAWAY ADAPTER SYSTEM FACILITATING BOTH FRONT-MOUNTED AND REAR-MOUNTED CONFIGURATIONS OF A SPRAYER BOOM

(71) Applicant: CNH Industrial America LLC, New Holland, PA (US)

(72) Inventor: Brian J. Pilney, West Bend, WI (US)

(73) Assignee: CNH Industrial America LLC, New Holland, PA (US)

( * ) Notice: Subject to any disclaimer, the term of this patent is extended or adjusted under 35 U.S.C. 154(b) by 221 days.

(21) Appl. No.: 15/131,512

(22) Filed: Apr. 18, 2016

(65) Prior Publication Data

US 2016/0316734 A1     Nov. 3, 2016

Related U.S. Application Data

(60) Provisional application No. 62/153,817, filed on Apr. 28, 2015.

(51) Int. Cl.
*A01M 7/00*    (2006.01)
*A01C 23/00*    (2006.01)

(52) U.S. Cl.
CPC ......... *A01M 7/0053* (2013.01); *A01C 23/008* (2013.01); *A01M 7/0078* (2013.01); *A01M 7/0082* (2013.01)

(58) Field of Classification Search
CPC .............. A01M 7/0053; A01M 7/0078; A01M 7/0082; A01C 23/008
See application file for complete search history.

(56) References Cited

U.S. PATENT DOCUMENTS

| | | |
|---|---|---|
| 3,425,628 A | 2/1969 | Reams |
| 4,044,952 A | 8/1977 | Williams et al. |
| 5,000,385 A | 3/1991 | Trusty et al. |
| 5,029,757 A | 7/1991 | Bourgault et al. |
| 5,248,091 A | 9/1993 | Thyberg |
| 5,927,606 A | 7/1999 | Patterson |
| 6,027,039 A | 2/2000 | Mercil |
| 6,119,963 A | 9/2000 | Bastin et al. |
| 6,138,770 A | 10/2000 | Kayser |
| 7,073,735 B2 | 7/2006 | Wubben et al. |
| 7,364,096 B1 | 4/2008 | Sosnowski et al. |
| 7,740,190 B2 | 6/2010 | Peterson et al. |
| 8,864,048 B1 | 10/2014 | Light |
| 2012/0237284 A1 | 9/2012 | Bouten et al. |
| 2015/0098753 A1 | 4/2015 | Kuphal |
| 2016/0316738 A1* | 11/2016 | Pilney ................. A01M 7/0078 |

* cited by examiner

*Primary Examiner* — John C Hong
(74) *Attorney, Agent, or Firm* — Rebecca L. Henkel; Richard K. DeMille

(57) ABSTRACT

A breakaway adapter system is provided that allows the same breakaway joints and breakaway boom segments to be used with either front-mounted or rear-mounted booms. The adapter system may have a multi-piece construction with a secondary boom segment end cap that can be reconfigured to receive either a left-side hinged or right-side hinged adapter hinge bracket or hinge plate. This allows a main boom body to be reversed for switching between front-mounted and rear-mounted configurations by rotating the main boom body 180-degrees while retaining breakaway joints and breakaway boom segments in rearward deflecting positions.

17 Claims, 11 Drawing Sheets

BREAKAWAY ADAPTER SYSTEM FACILITATING BOTH FRONT-MOUNTED AND REAR-MOUNTED CONFIGURATIONS OF A SPRAYER BOOM

CROSS-REFERENCE TO RELATED APPLICATION

The present application claims the benefit of U.S. Ser. No. 62/153,817 filed Apr. 28, 2015.

FIELD OF THE INVENTION

The invention relates generally to agricultural product application equipment such as self-propelled sprayers and, in particular, to a breakaway adapter system facilitating mounting of a sprayer boom of an agricultural sprayer in both front-mounted and rear-mounted configurations.

BACKGROUND OF THE INVENTION

Front-mounted boom sprayer vehicles and rear-mounted booms sprayer vehicles offer different advantages. Typical sprayer booms have breakaway joints with hinges integrated directly into end wall or caps of secondary boom segments. The breakaway joints allow breakaway boom segments at the outer ends of the boom to pivot in a rearward direction or opposite as forward travel direction of the sprayer vehicle for both front-mounted and rear-mounted booms if the breakaway boom segments touch the crops, the ground, or run into an object. This makes typical sprayer booms monodirectional, whereby front-mounted and rear-mounted booms are not interchangeable because using one for the other application positions the breakaway joints to pivot in the wrong direction. That is because in order to use an exact boom configuration for front-mounted and rear-mounted applications, the boom has to be rotated 180-degrees for the other application. That is because the vehicle mounting surface(s) of the boom must face the vehicle in either application, whereby the vehicle mounting surface(s) of the boom faces rearward in a front mounted boom application and forward in a rear mounted boom application.

SUMMARY OF THE INVENTION

A breakaway adapter system is provided that allows the same breakaway joints and breakaway boom segments to be used with either front-mounted or rear-mounted booms. This allows for using a common boom for both front-mounted and rear-mounted applications, with common breakaway joints and breakaway boom segments, which reduces inventory and simplifies parts support. The breakaway adapter system can convert a sprayer boom of an agricultural sprayer between front-mounted and rear-mounted configurations, depending on the type of sprayer on which the boom will be mounted.

According to one aspect of the invention, the adapter system has a multi-piece construction with a secondary boom segment end cap that can be reconfigured to receive either a left-side hinged or right-side hinged adapter hinge bracket or hinge plate. This allows a main boom body to be reversed for switching between front-mounted and rear-mounted configurations by rotating the main boom body 180 degrees while retaining breakaway joints and breakaway boom segments in rearward deflecting positions.

The breakaway adapter system may include a secondary boom segment end cap with an end cap adapter plate having common mounting holes and two adapter mounting holes. The common mounting holes in the end cap adapter plate receive fasteners for mounting both left-side hinged and right-side hinged end cap hinge plates. The two adapter mounting holes are arranged toward the top and at opposite sides of the secondary boom segment end cap adapter plate. One of the adapter mounting holes receives a fastener at a left or right side of the secondary boom segment end cap, corresponding to which of the left-side hinged and right-side hinged end cap hinge plates is being used. That is because the fastener of the adapter mounting hole(s) is received through a corresponding hole at a damper support yoke or shock mount at an upper left portion of the left-side hinged end cap hinge plate or an upper right portion of the right-side hinged end cap hinge plate. The mirrored left-side hinged or right-side hinged end cap hinge plates and the end cap adapter plate are configured to allow the breakaway boom segment to move in a left- or right-hand direction, respectively, depending on the direction the boom faces so as to ensure that the breakaway boom segment is arranged to move in a rearward direction during deflection.

According to another aspect of the invention, a breakaway adapter system is provided for converting a sprayer boom of an agricultural sprayer between front-mounted and rear-mounted configurations. The sprayer boom includes a main boom body connected to the agricultural sprayer with the main boom body having a sprayer facing side facing toward the sprayer and an outwardly facing side facing away from the sprayer. A pair of breakaway boom segments is arranged outwardly beyond outer ends of the main boom body. A pair of breakaway joints is arranged between the outer ends of the main boom body and the pair of breakaway boom segments. The breakaway joints are configured to allow the breakaway boom segments to deflect in rearward deflection directions. A pair of adapter arrangements is provided between the outer ends of the main boom body and the pair of breakaway joints. Each adapter arrangement is configured to engage and support either breakaway joint of the pair of breakaway joints. When the sprayer boom is in the front-mounted configuration, the breakaway joints mount to the adapter arrangements in a first mounting position in which the breakaway joints are arranged to allow the breakaway boom segments to deflect in a deflection direction that is common with a direction faced by the sprayer facing side of the main boom body. When the sprayer boom is in the rear-mounted configuration, the breakaway joints mount to the adapter arrangements in a second mounting position in which the breakaway joints are arranged to allow the breakaway boom segments to deflect in a deflection direction that is common with a direction faced by the outwardly facing side of the main boom body.

According to another aspect of the invention, when converting the sprayer boom between front-mounted and rear-mounted configurations, the boom main body changes to an opposite orientation by rotating to face an opposite direction. When the sprayer boom is in the front-mounted configuration, the sprayer facing side of the main boom body faces toward a front end of the spray and opposite a forward travel direction of the sprayer. When the sprayer boom is in the rear-mounted configuration, the sprayer facing side of the main boom body faces toward a back end of the spray and toward a forward travel direction of the sprayer.

According to another aspect of the invention, when converting the sprayer boom between front-mounted and rear-mounted configurations, the breakaway joints maintain the same orientation when the sprayer boom is in either one of the front-mounted and rear-mounted configurations. When converting the sprayer boom between front-mounted and rear-mounted configurations, the breakaway boom segments maintain the same orientation when the sprayer boom is in either one of the front-mounted and rear-mounted configurations.

According to another aspect of the invention, each adapter arrangement has an adapter plate with multiple adapter holes selectively receiving a fastener to define the first and second mounting positions of the adapter arrangements.

According to another aspect of the invention, a first hinge plate is configured to allow deflection of the breakaway boom segment in a first direction and a second hinge plate is configured to allow deflection of the breakaway boom segment in a second direction. The first and second mounting positions of the adapter arrangements allow for mounting the first and second hinge plates, and the hinge plates may support the breakaway joints. Each adapter plate may have first and second adapter tabs with the first and second mounting holes extending through the respecting first and second tabs to selectively receive a fastener to provide the first and second mounting positions of the adapter arrangements. The first hinge plate may define a left-side hinged hinge plate that allows the breakaway boom segment to deflect to the left when viewed from beyond the breakaway boom segment facing toward the breakaway joint. The second hinge plate may define a right-side hinged hinge plate that allows the breakaway boom segment to deflect to the right when viewed from beyond the breakaway boom segment facing toward the breakaway joint. The left- and right-side hinged hinge plates include shock mounts extending upwardly from respective left and right portions that align with a corresponding one of the first and second adapter tabs of the adapter plate for connecting the left-side hinged and right-side hinged hinge plates to the adapter plates.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
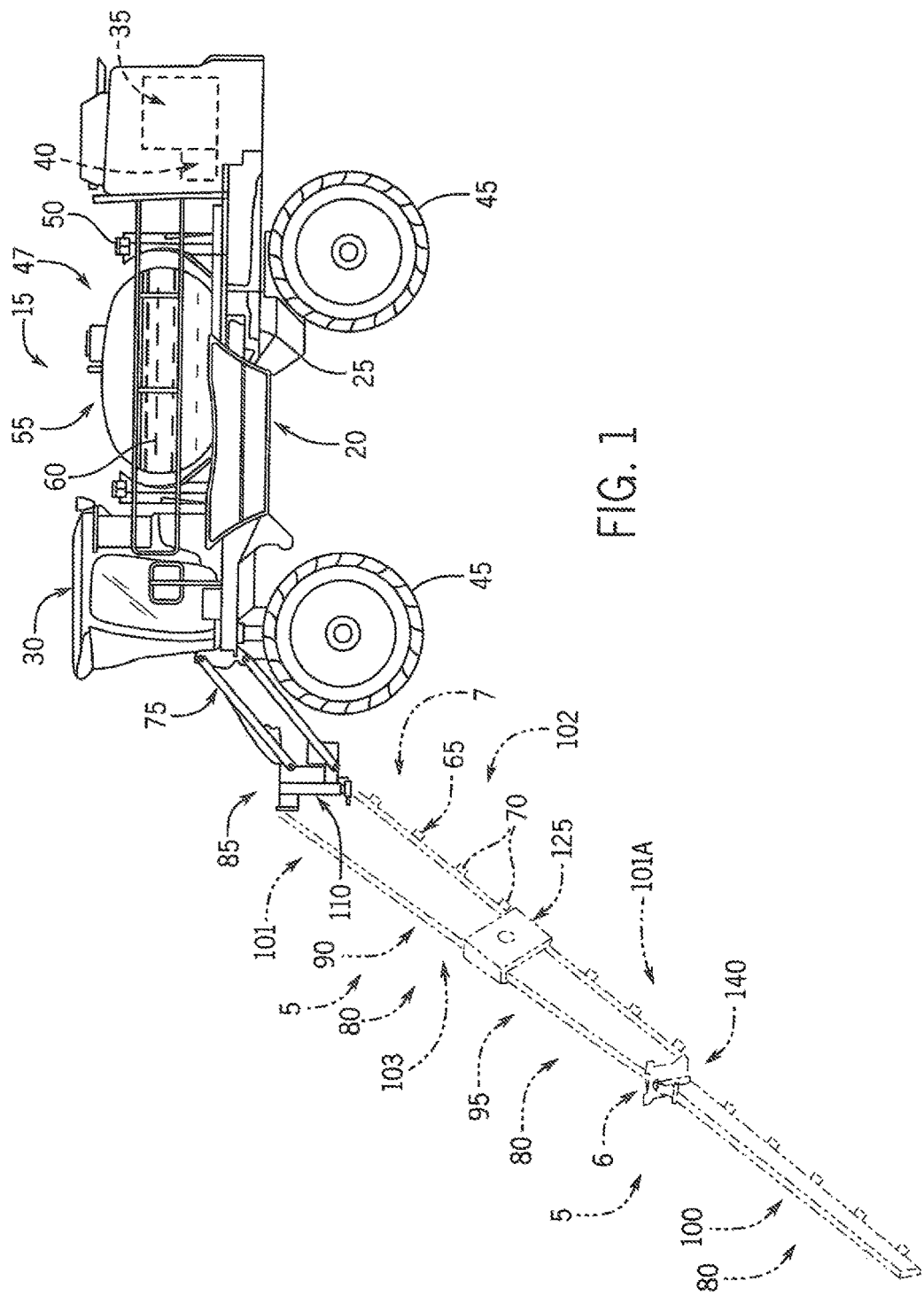
FIG. 1 is a side elevation of a self-propelled sprayer with a breakaway adapter system arranged for mounting a boom in a front-mounted configuration according to the present invention.
Figure 2:
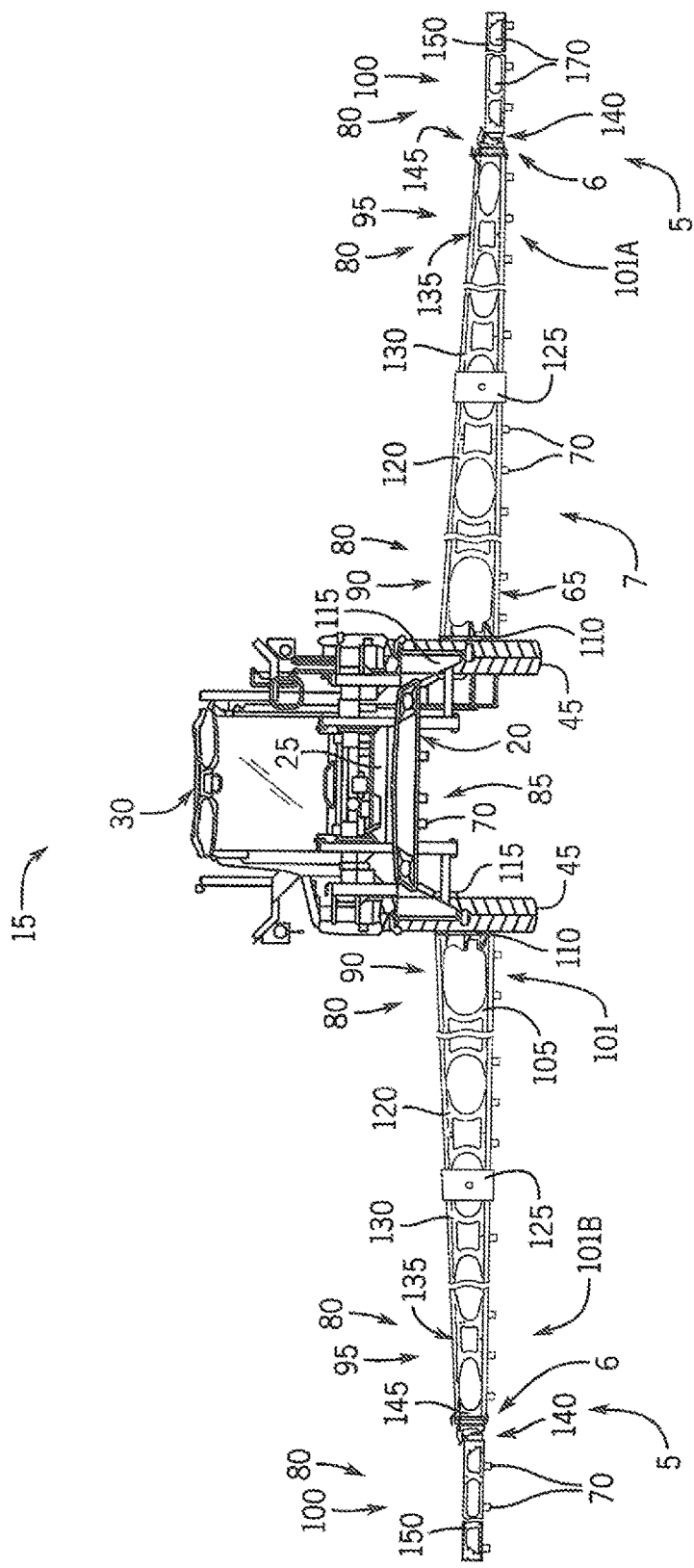
FIG. 2 is a front elevation of a breakaway adapter system arranged for mounting a boom in a front-mounted configuration according to the present invention.
Figure 3:
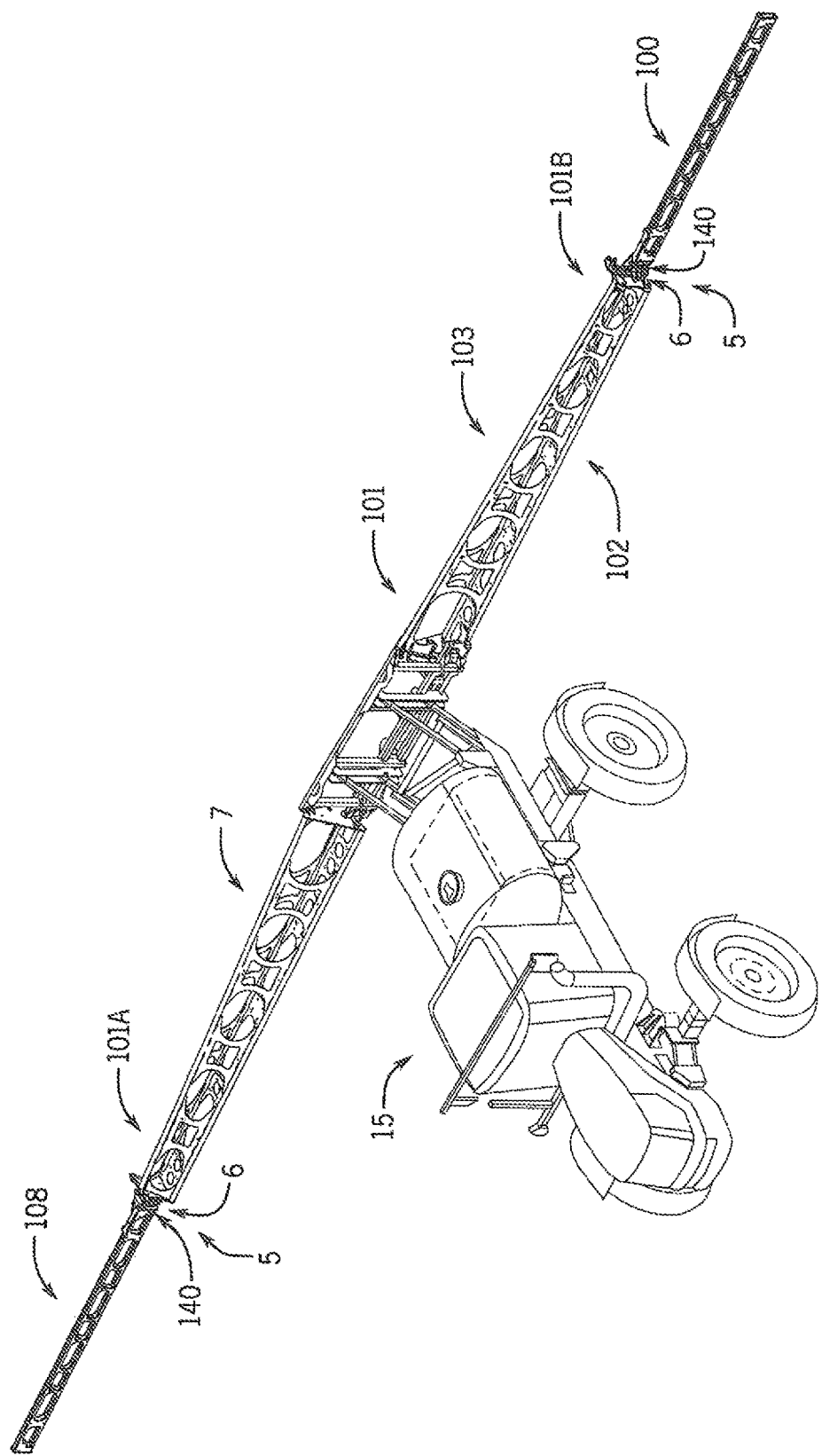
FIG. 3 is a pictorial view of a self-propelled sprayer with a breakaway adapter system arranged for mounting a boom in a rear-mounted configuration according to the present invention.

Referring now to the drawings and specifically to FIG. 1, a breakaway adapter system 5 with adapter arrangements 6 are shown used with boom 7 that allows the same breakaway joints and breakaway boom segment to be used with either front-mounted or rear-mounted configurations of boom 7, as explained in greater detail elsewhere herein. Breakaway adapter joint system 5 and boom 7 are shown, incorporated on an agricultural sprayer. The agricultural sprayer is shown here as a self-propelled agricultural sprayer vehicle or self-propelled sprayer 15. FIGS. 1-2 show boom 7 in a front-mounted configuration on sprayer 15, such as those available from CNH Industrial, including the Miller Nitro sprayers and New Holland Guardian Series front-boom sprayers. FIG. 3 shows boom 7 in a rear-mounted configuration on sprayer 15, such as those available from CNH Industrial, including the Miller Condor Series sprayers and New Holland Guardian Series rear-boom sprayers.

Referring again to FIG. 1, sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. Referring now to FIG. 3 sprayer 15 in mechanical drive applications, a mechanical transmission receives power from engine 35 and delivers power for rotating wheels 45 by way of power-transmitting driveline components such as drive shafts, differentials, and other gear sets in portal, drop boxes, or other housings. Referring now to FIGS. 1-3, spray system 47 includes storage containers such as rinse tank 50 storing water or a rinsing solution, and product tank 55 that stores a volume of product 60 for delivery onto an agricultural field with sprayer 15. Product 60 includes any of a variety of agricultural, liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a boom tubing system 65 for release out of spray nozzles 70 that are spaced from each another along the width of boom 7 during spraying operations of sprayer 15.

Referring now to HG. 2, groups or banks of multiple adjacent spray nozzles 70 define multiple spray sections 72 of spray system 47. Stray sections 72 are defined along boom 7 and selectively deliver product 60 for release onto an agricultural field at locations corresponding to positions of activated spray sections 72. Boom 7 is connected to chassis 20 with lift arm assembly 75 (FIG. 1) that is configured to move the boom 7 up and down for adjusting the height of application of the product 60. Boom 7 includes multiple boom segments 80 connected longitudinally to provide the corresponding width of the assembled boom 7. Boom segments 80 include center section 85 and left and right boom arms extending in opposite directions from center section 85. Left and right boom arms have multiple segments with pairs of primary boom segments 90, secondary boom segments 95, and breakaway boom segments 100 extending in opposite directions along the respective left and right boom arms mirrored about a longitudinal axis of the sprayer 15. Collectively, center section 85 and the primary and secondary boom sections 90, 95 extending in both directions from center section 85 define a main boom body 101 to which the breakaway boom segments 100 are attached. Main boom body 101 has first and second ends 101A, 101B and the adapter arrangements 6 of breakaway adapter system 5 are arranged at the main boom body 101, between each of the outwardly of the first and second ends 101A, 101B and the respective breakaway boom segment 100. Main boom body 101 has an inner or sprayer facing side 102 that faces toward sprayer 15 and provides a vehicle mounting surface(s) with mounting structures configured for mounting boom 7 to lift arm assembly 75. Opposite the sprayer facing side 102 is outer or outwardly facing side 103 of main boom body 101 that faces away from sprayer 15.

Referring again to FIG. 2, the corresponding left and right segments of the pairs of primary, secondary, and breakaway boom segments 90, 95, 100 are substantially identical, so only one will be described, with the description applying to both the left and right segments of left and right boom arms. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 7 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward primary boom segment 90. Secondary boom segment 95 extends from secondary boom inner end 130 away from primary boom segment 90 to secondary boom outer end 135. Breakaway adapter system 5 includes breakaway joint 140 that is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 7, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

Figure 4:
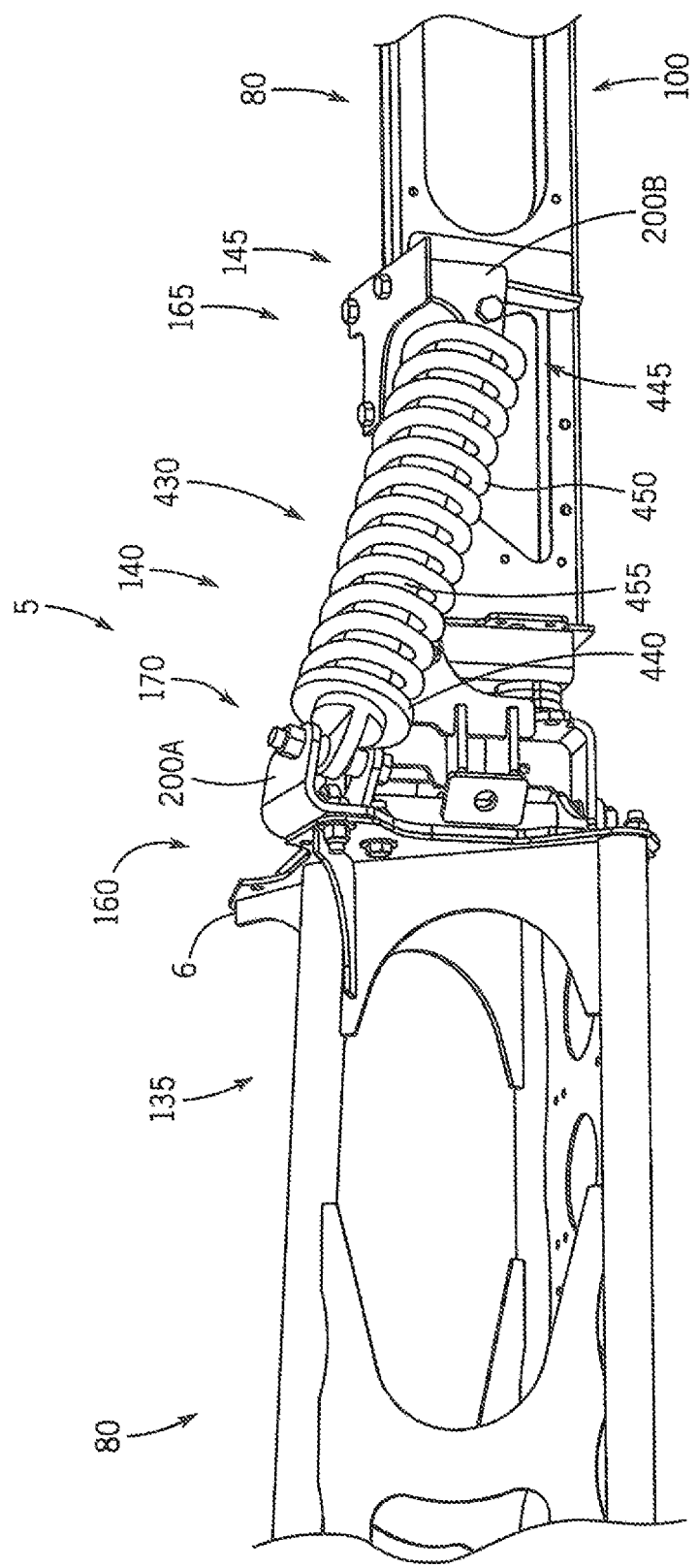
FIG. 4 is a pictorial view of an adapter arrangement according to the present invention.
Figure 5:
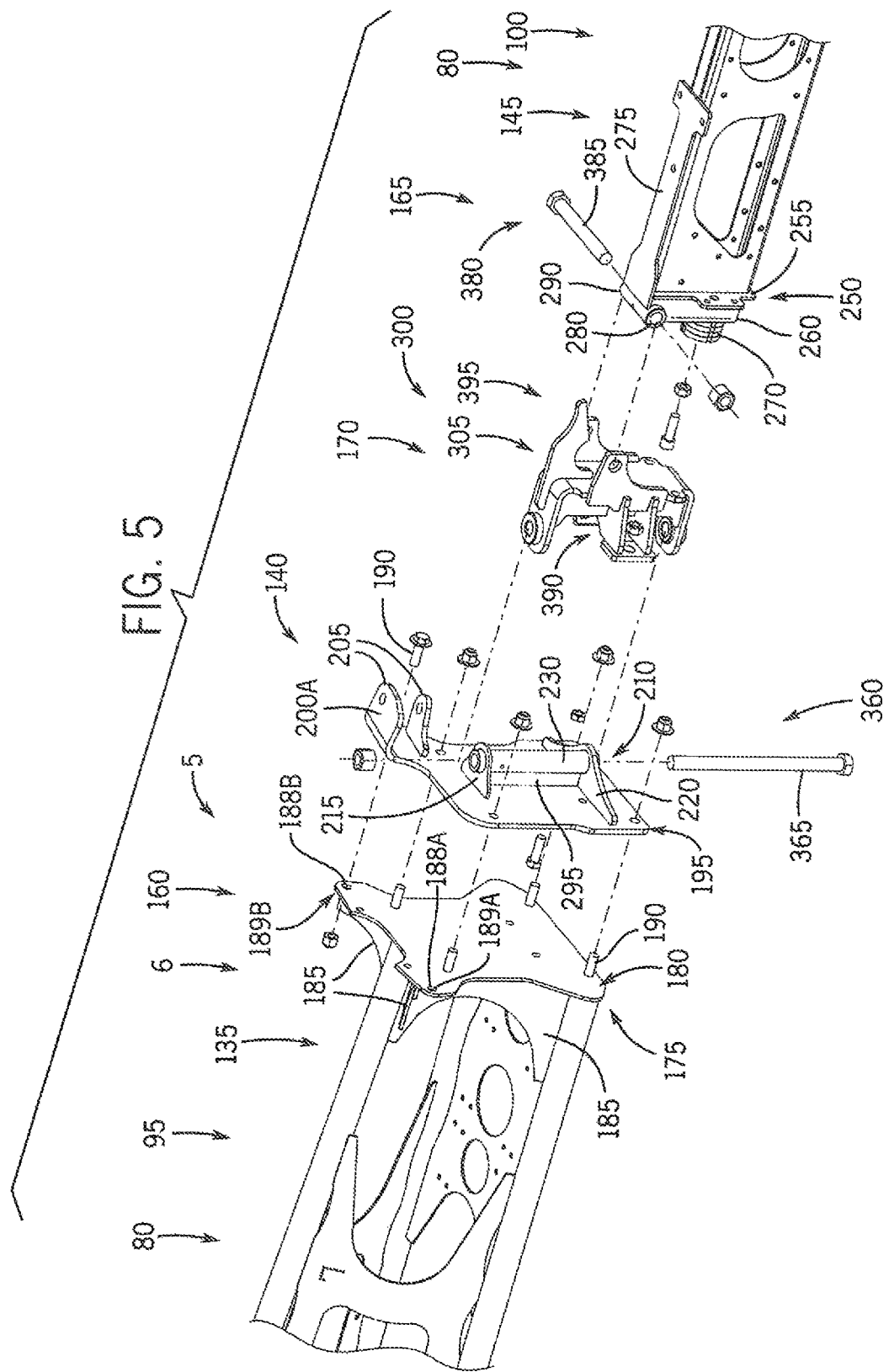
FIG. 5 is an exploded isometric view of an adapter arrangement according to the present invention.

Referring now to FIGS. 4-5, breakaway adapter system 5 includes breakaway joint 140 shown here configured for multi-axis independent deflection, rearwardly and/or upwardly. Breakaway joint 140 includes inner bracket assembly 160 that is connected to a first boom segment 80, shown connected to secondary boom outer end 135. Outer bracket assembly 165 of breakaway joint 140 is connected to a second boom segment 80, shown connected to breakaway boom inner end 145. Intermediate joint assembly 170 of breakaway joint 140 is arranged between and interconnects the inner and outer bracket assemblies 160, 165. Each adapter assembly 6 has an adapter plate, shown implemented on boom segment end cap 175 as end cap adapter plate 180. End cap plate adapter plate 180 has opposite outer and inner surfaces. Interconnected gusset plates 185 extend inwardly from the inner surface of end cap adapter plate 180 and are connected to the secondary boom outer end 135.

Figure 6:
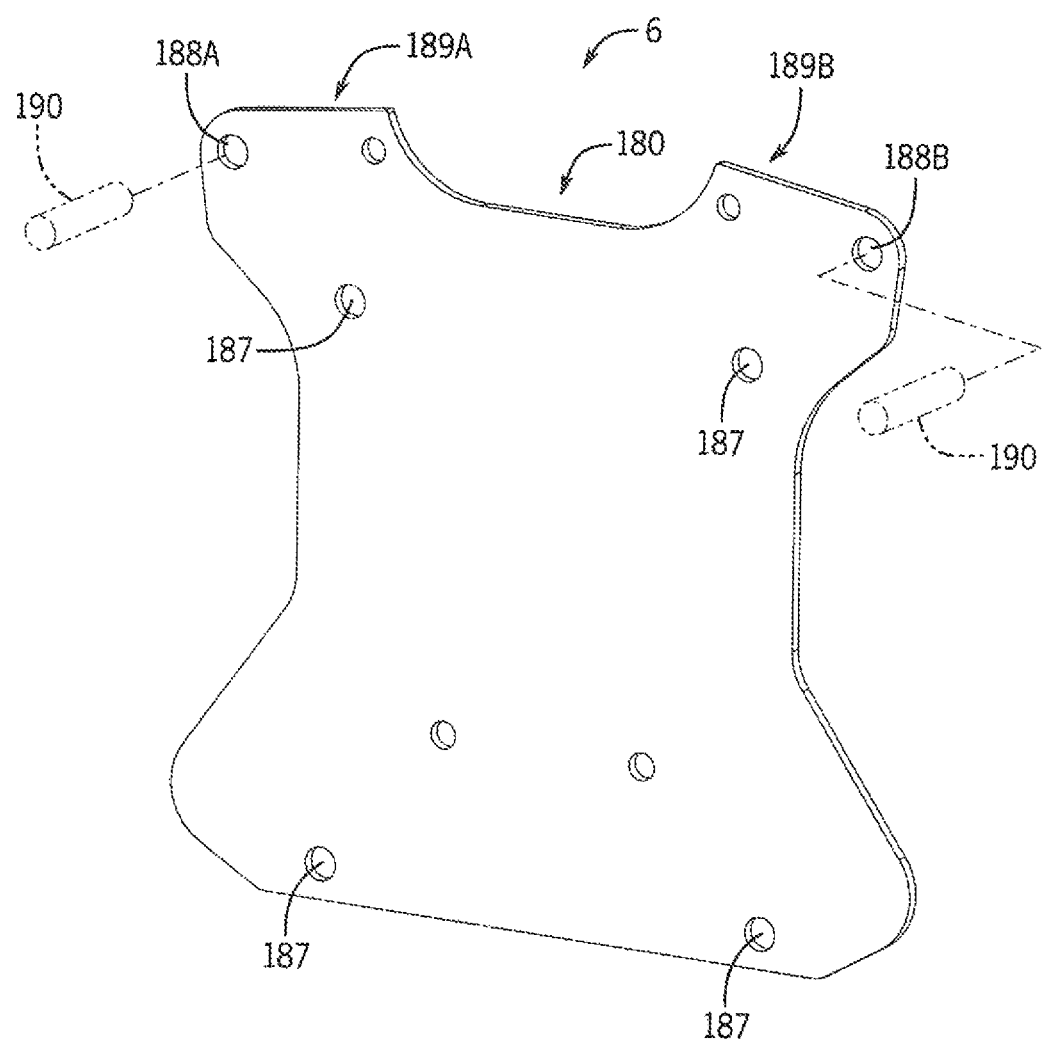
FIG. 6 is a front elevation view of an end cap adapter plate of an adapter arrangement according to the present invention.

Referring now to FIG. 6, end cap adapter plate 180 has a first set of common main mounting holes 187 and a second set of adapter mounting holes 188A, 188B. The adapter mounting holes 188A, 188B respectively extend through adapter tabs 189A, 189B that extend upwardly from the top and at opposite sides of the end cap adapter plate 180. Referring now to FIG. 5, fasteners 190, which may be threaded studs, bolts, or other fasteners, are each secured at an inner end of the fastener 190 end in the holes 187, 188 and have an outer end that extends from the outer surface of end cap adapter plate 160 for connecting end cap hinge plate 195 to end cap adapter plate 180.

Figure 8:
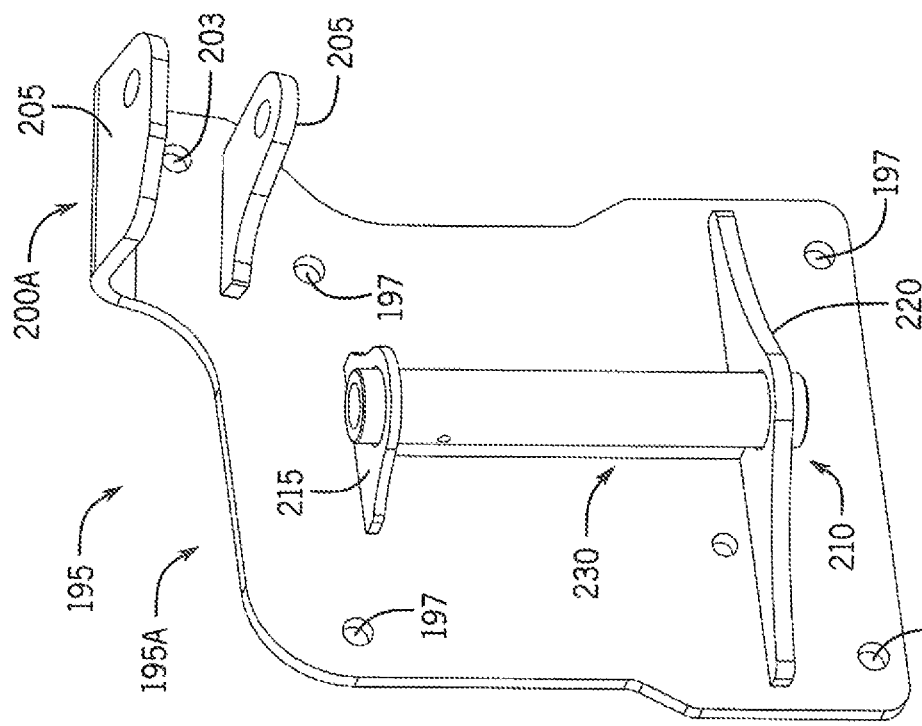
FIG. 8 is a front elevation view of an end cap hinge plate of an adapter arrangement according to the present invention.
Figure 7:
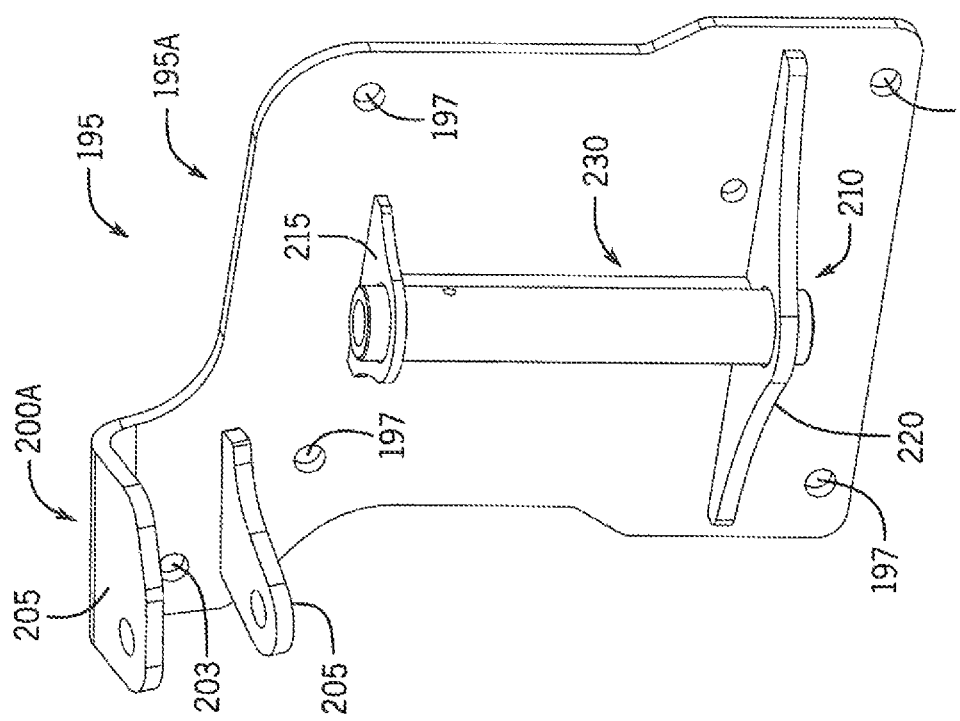
FIG. 7 is a front elevation view of an end cap hinge plate of an adapter arrangement according to the present invention.

Referring now to FIGS. 7-8, end cap hinge plate 195 can be either a left-side hinged hinge plate shown as left-side hinged end cap hinge plate 195A (FIGS. 4 and 7) or a right-side hinged hinge plate shown as right-side hinged end cap hinge plate 195B (FIGS. 5 and 8), which are mirror images of each other. Main mounting holes 197 extend through the hinge plate 195 that aligns with main mounting holes 187 of the end cap adapter plate 180 for connecting to the end cap adapter plate 18 when assembling the adapter arrangement 6. Shock mount 200A is arranged at an upper portion of the end cap hinge plate 195 and has shock mount back wall hole 203 extending through its back wall. Shock mount 200A extends upwardly from an upper left portion of left-side hinged end cap hinge plate 195A and extends upwardly from an upper right portion of right-side hinged end cap hinge plate 195B. Referring now to FIG. 7, shock mount back wall hole 203 is aligned with adapter mounting hole 188A (FIG. 6) and a corresponding fastener 190 (FIG. 5) of adapter tab 189A of end cap adapter plate 180 for a left-side hinged end cap hinge plate 195A. Referring now to FIG. 8, shock mount back wall hole 203 is aligned with adapter mounting hole 188B (FIG. 6) of adapter tab 189B and a corresponding fastener 190 of end cap adapter plate 180 for a right-side hinged end cap hinge plate 195B. Referring now to FIGS. 6-8, in this way, end cap adapter plates 180 of the first and second ends 101A, 101B (FIGS. 2-3) of main boom body 10 can be reconfigured to mount either a left- or ride-side hinged end cap hinge plate 195A, 195B based on whether boom 7 is implemented in a front-mounted boom of a front-boom sprayer 15 (FIG. 1) or rear-mounted boom of a rear-boom sprayer 15 (FIG. 3) configuration by selectively securing fastener 190 in a corresponding one of the adapter mounting holes 188A, 188B.

Referring again to FIGS. 7-8, shock mount 200A has a pair of tabs 205 with holes to receive a shock mounting fastener. Hinge support mount 210 is arranged at an intermediate portion of the outer surface of end cap hinge plate 195. Hinge support mount 210 includes horizontally extending upper and lower braces 215, 220 and a vertically extending back brace 225 that collectively support a hinge barrel shown as hinge tube 230 in a generally vertical orientation.

Referring now to FIGS. 5-6, outer bracket assembly 165 of breakaway joint 140 includes breakaway boom segment bracket 250 having side plate 255 arranged vertically and connected to an end surface of breakaway boom inner end 145. Box 260 of breakaway boom segment bracket 250 is connected to side plate 255. Stop 270, which may include a rubber contact pad, is attached to a lower segment of box 260. Top plate 275 extends across a portion of an upper surface of the breakaway boom inner end 145 and a portion of an upper surface of side plate 255 and box 260. An upper portion of box 260 has a recess 280 that supports a hinge barrel shown as hinge tube 290 in a generally horizontal orientation. Intermediate joint assembly 170 includes compound hinge assembly 300 which is configured to freely accommodate deflection of breakaway boom segment 100 through multiple links that allow simultaneous up/down movement and back/forward movement, with vertical and horizontal movement components independent of each other. Referring now to FIG. 5, compound hinge assembly 300 includes intermediate hinge body 305 with a base segment 310 and extending generally vertically within the inner side 315 facing inner bracket assembly 160, and outer side 320 facing outer bracket assembly 165 and upper and lower ends 325, 330. Inner hinge tabs 335 with aligned holes 340 (FIG. 6) extend horizontally inward from inner side 315 at upper and lower ends 325, 330 of intermediate hinge body 305. Outer hinge tabs 345 with aligned holes 350 extend vertically outward from outer side 320 of opposites sides of the intermediate hinge body 305. When breakaway boom segment 100 deflects through movement of compound hinge assembly 300, breakaway boom segment 100 may be biased back to the neutral position and have its movement damped by a single biasing and damping arrangement 430, shown as coil over spring damper 435 with first end 440 mounted in shock mount 200A arranged at inner bracket assembly 160 and second end in 445 mounted in shock mount 200B arranged at an outer bracket assembly 165. Coil over spring damper 435 includes compression spring 450 arranged concentrically outside of damper 455 which may be a hydraulic damper. Coil over spring damper 435 extends angularly between the inner and outer bracket assemblies 160, 165 so that it is arranged to apply a biasing component both down and forward to the breakaway boom segment 100, which biases the breakaway boom segment 100 to its neutral position about both the inner and outer hinge arrangements 360, 380.

Figure 9:
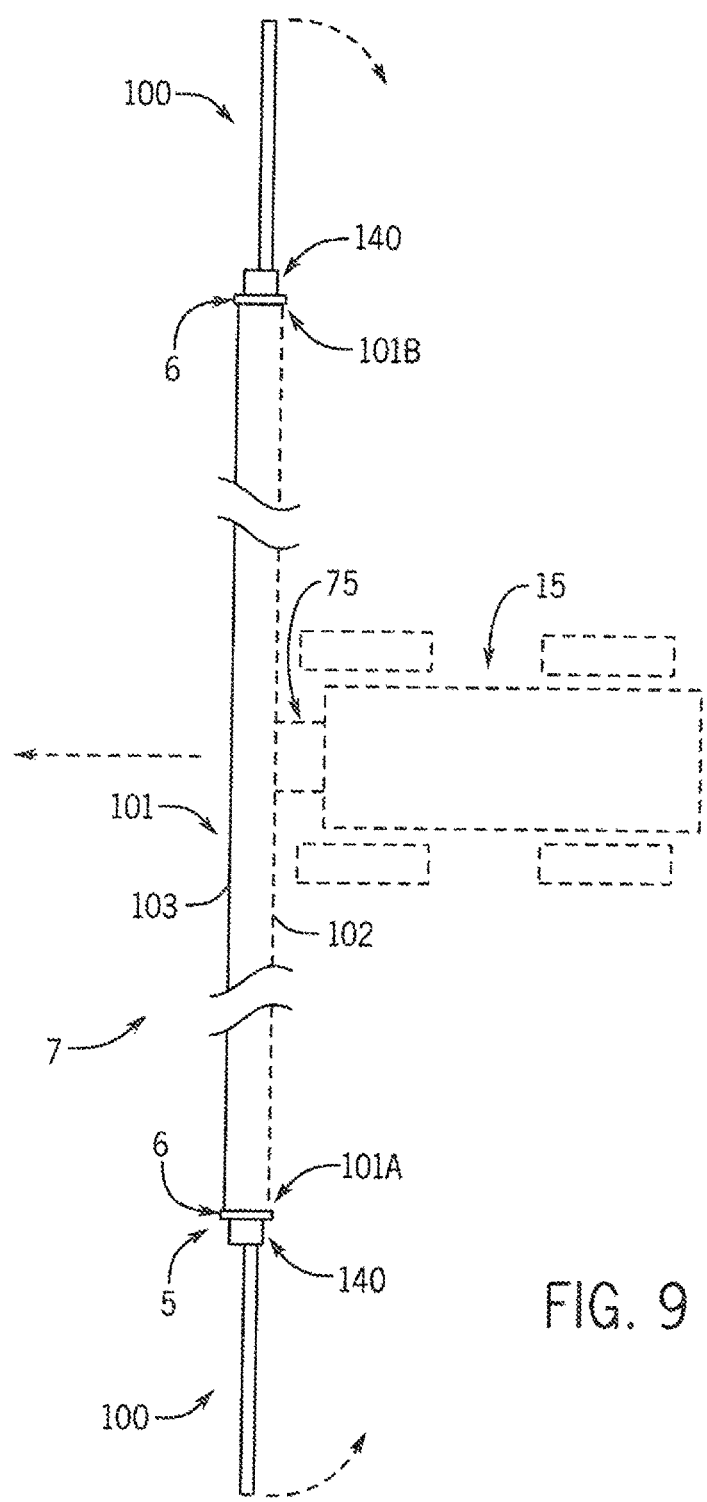
FIG. 9 is a simplified schematic top plan view of a breakaway adapter system arranged for mounting a boom in a front-mounted configuration according to the present invention.
Figure 10:
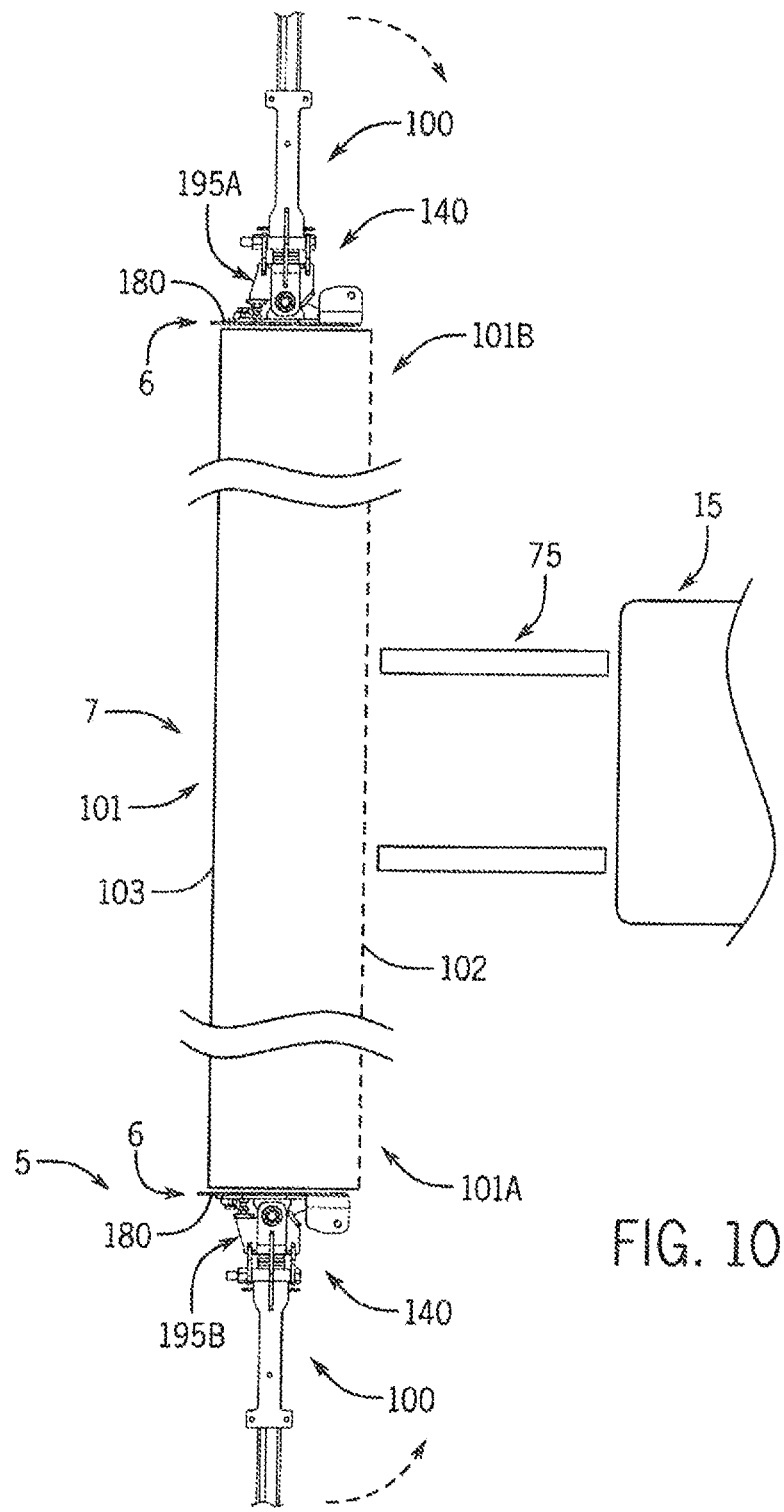
FIG. 10 is another simplified schematic top plan view of a breakaway adapter system arranged for mounting a boom in a front-mounted configuration according to the present invention.

Regardless of the particular configuration of breakaway joint 140, breakaway adapter system 5 allows the same breakaway joints 140 and breakaway boom segments 100 to be used with either front-mounted or rear-mounted booms 7. FIGS. 9-10 show the breakaway adapter system 5 arranged for a front-mounted configuration of boom 7. With boom in the front-mounted configuration, first end 101A of main boom body 101 is arranged to the left of sprayer 15 and second end 101B is arranged to the right of sprayer 15. At first end 101A of main boom body 101, fasteners 190 are mounted in the common mounting holes 187 and adapter mounting hole 188B with right-side hinged end cap hinge plate 195B mounted to the end cap adapter plate 180. At second end 101B of main boom body 101, fasteners 190 are mounted in the common mounting holes 187 and adapter mounting hole 188A with left-side hinged end cap hinge plate 195A mounted to the end cap adapter plate 180. This provides a first mounting position of adapter arrangements 6 in which the breakaway joints 140 are arranged to allow the breakaway boom segments 100 to deflect in a deflection direction that is common with a direction faced by the sprayer facing side 101A of main boom body 101.

Figure 11:
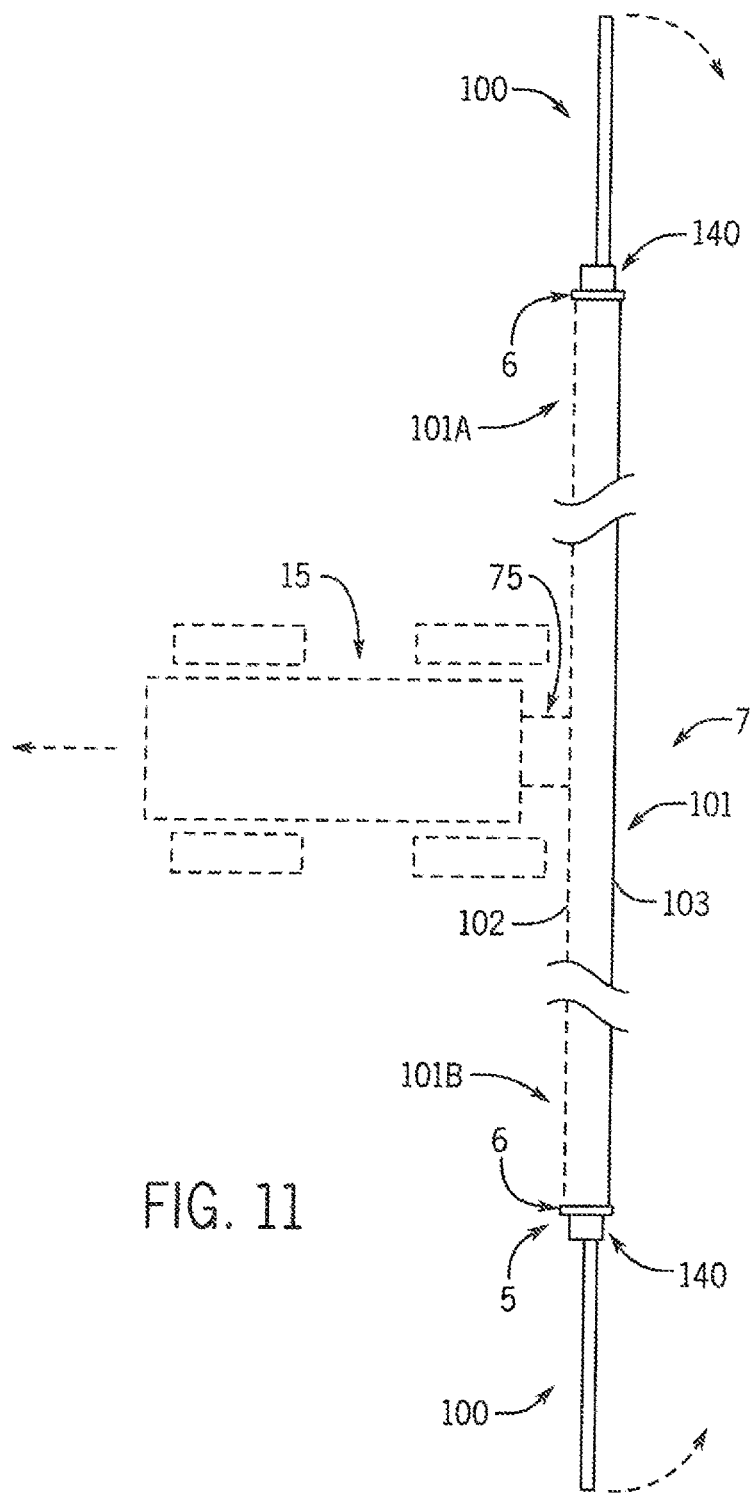
FIG. 11 is a simplified schematic top plan view of a breakaway adapter system arranged for mounting a boom in a rear configuration according to the present invention.
Figure 12:
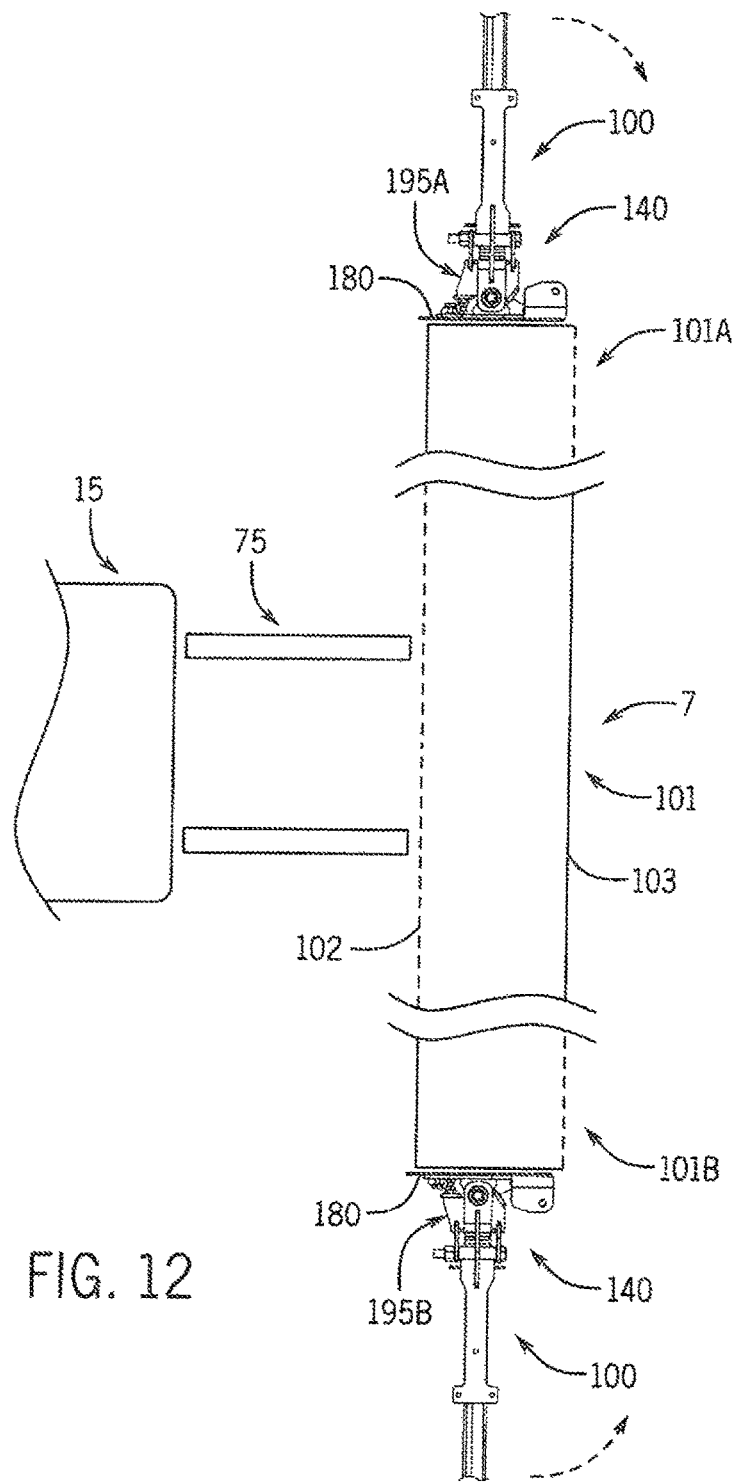
FIG. 12 is another simplified schematic top plan view of a breakaway adapter system arranged for mounting a boom in a rear-mounted configuration according to the present invention.

FIGS. 11-12 show the breakaway adapter system 5 arranged for a rear-mounted configuration of boom 7. When boom 7 is in the rear-mounted configuration, first end 101A of main boom body 101 is arranged to the right of sprayer 15 and second end 101B is arranged to the left of sprayer 15. At first end 101A of main boom body 101, fasteners 190 are mounted in the common mounting holes 187 and adapter mounting hole 188A with left-side hinged end cap hinge plate 195A mounted to the end cap adapter plate 180. At second end 101B of main boom body 101, fasteners 190 are mounted in the common mounting holes 187 and adapter mounting hole 188B with right-side hinged end cap hinge plate 195B mounted to the end cap adapter plate 180. This provides a second mounting position of adapter arrangements 6 in which the breakaway joints 140 are arranged to allow the breakaway boom segments 100 to deflect in a deflection direction that is common with a direction faced by the outwardly facing side 100B of the main boom body 101.

Many changes and modifications could be made to the invention without departing from the spirit thereof. The scope of these changes will become apparent from the appended claims.

What is claimed is:
1. A breakaway adapter system facilitating both front-mounted and rear-mounted configurations of a sprayer boom of an agricultural sprayer, wherein the sprayer boom includes a main boom body connected to the agricultural sprayer with the main boom body having outer ends, a sprayer facing side facing toward the sprayer, and an outwardly facing side facing away from the sprayer, wherein the breakaway adapter system comprises:
  a pair of breakaway boom segments arranged outwardly beyond outer ends of the main boom body;
  a pair of breakaway joints arranged between the outer ends of the main boom body and the pair of breakaway boom segments, wherein the breakaway joints are configured to allow the breakaway boom segments to deflect in rearward deflection directions; and
  a pair of adapter arrangements between the outer ends of the main boom body and the pair of breakaway joints, each adapter arrangement configured to engage and support either breakaway joint of the pair of breakaway joints;

wherein when the sprayer boom is in the front-mounted configuration, the breakaway joints mount to the adapter arrangements in a first mounting position in which the breakaway joints are arranged to allow the breakaway boom segments to deflect in a deflection direction that is common with a direction faced by the sprayer facing side of the main boom body; and wherein when the sprayer boom is in the rear-mounted configuration, the breakaway joints mount to the adapter arrangements in a second mounting position in which the breakaway joints are arranged to allow the breakaway boom segments to deflect in a deflection direction that is common with a direction faced by the outwardly facing side of the main boom body.

2. The breakaway adapter system of claim 1 wherein when converting the sprayer boom between front-mounted and rear-mounted configurations, the main boom body changes to an opposite orientation by rotating to face an opposite direction such that when the sprayer boom is in the front-mounted configuration, the sprayer facing side of the main boom body faces toward a front end of the spray and opposite a forward travel direction of the sprayer and when the sprayer boom is in the rear-mounted configuration, the sprayer facing side of the main boom body faces toward a back end of the spray and toward a forward travel direction of the sprayer.

3. The breakaway adapter system of claim 2 wherein when converting the sprayer boom between front-mounted and rear-mounted configurations, the breakaway joints maintain the same orientation when the sprayer boom is in either one of the front-mounted and rear-mounted configurations.

4. The breakaway adapter system of claim 3 wherein when converting the sprayer boom between front-mounted and rear-mounted configurations, the breakaway boom segments maintain the same orientation when the sprayer boom is in either one of the front-mounted and rear-mounted configurations.

5. The breakaway adapter system of claim 1 wherein each adapter arrangement further comprises an adapter plate having multiple adapter holes selectively receiving a fastener to define the first and second mounting positions of the adapter arrangements.

6. The breakaway adapter system of claim 5 further comprising a first hinge plate configured to allow deflection of the breakaway boom segment in a first direction, and a second hinge plate configured to allow deflection of the breakaway boom segment in a second direction, and wherein the first and second mounting positions of the adapter arrangements allow for mounting the first and second hinge plates.

7. The breakaway adapter system of claim 6 wherein each adapter plate has first and second adapter tabs with the first and second mounting holes extending through the respective first and second tabs to selectively receive a fastener to provide the first and second mounting positions of the adapter arrangements.

8. The breakaway adapter system of claim 7 wherein the breakaway joints are supported by the first and second hinge plates.

9. The breakaway adapter system of claim 8 wherein, the first hinge plate defines a left-side hinged hinge plate allowing the breakaway boom segment to deflect to the left when viewed from beyond the breakaway boom segment facing toward the breakaway joint, and the second hinge plate defines a right-side hinged hinge plate allowing the breakaway boom segment to deflect to the right when viewed from beyond the breakaway boom segment facing toward the breakaway joint.

10. The breakaway adapter system of claim 9 wherein the left-side hinged and right-side hinged hinge plates include shock mounts extending upwardly from respective left and right portions that align with a corresponding one of the first and second adapter tabs of the adapter plate for connecting the left-side hinged and right-side hinged hinge plates to the adapter plates.

11. A breakaway adapter system for a sprayer boom having a pair of breakaway boom segments of an agricultural sprayer, wherein the agricultural sprayer is configured as one of a front-boom sprayer and a rear-boom sprayer, the breakaway adapter system comprising:

a pair of adapter arrangements that can mount in at least a first mounting position and a second mounting position, wherein when the pair of adapter arrangements is in the first mounting position, the sprayer boom defines a front-mounted position for mounting the sprayer boom to a front-boom sprayer; and wherein when the pair of adapter arrangements is in the second mounting position, the sprayer boom defines a rear-mounted position for mounting the sprayer boom to a rear-boom sprayer.

12. The breakaway adapter system of claim 11 wherein each adapter arrangement further comprises an adapter plate having multiple adapter holes that define the first and second mounting positions of the pair of adapter arrangements.

13. The breakaway adapter system of claim 11 wherein the sprayer boom includes a main boom body connected to the agricultural sprayer and with the main boom body having a sprayer facing side facing toward the sprayer and an outwardly facing side facing away from the sprayer, wherein when the sprayer boom is in the front-mounted position, the sprayer facing side of the main boom body faces rearward toward the front-mounted boom sprayer; and wherein when the sprayer boom is in the rear-mounted position, the sprayer facing side of the main boom body faces forward toward the rear-mounted boom sprayer.

14. The breakaway adapter system of claim 13 further comprising a pair of breakaway boom segments arranged outwardly beyond outer ends of the main boom body with the pair of adapter arrangements between the pair of breakaway boom segments and the main boom body, wherein when the pair of adapter arrangements is in the first mounting position, the pair of adapter arrangements facilitates movement of the pair of breakaway boom segments in a deflection direction that is rearward and faces toward the front-mounted boom sprayer; and wherein when the pair of adapter arrangements is in the second mounting position, the pair of adapter arrangements facilitates movement of the pair of breakaway boom segments in a deflection direction that is rearward and faces away from the rear-mounted boom sprayer.

15. The breakaway adapter system of claim 14 wherein a pair of breakaway joints is arranged between the main boom body and the pair of breakaway boom segments, wherein each breakaway joint of the pair of breakaway joints includes at least one hinge configured to allow movement of the respective breakaway boom segment relative to the main boom body to define the deflection direction.

16. The breakaway adapter system of claim 15 wherein the pair of adapter arrangements comprises:
   a first adapter plate arranged at a first end of the main boom body;
   a second adapter plate arranged at a second end of the main boom body;
   a left-side hinged hinge plate that is configured for allowing the respective breakaway boom segment to pivot to the left when viewed from above; and
   a right-side hinged hinge plate that is configured for allowing the respective breakaway boom segment to pivot to the right when viewed from above.

17. The breakaway adapter system of claim 16 wherein, when the pair of adapter arrangements is in the first mounting position,
   the left-side hinged hinge plate is mounted to the first adapter plate arranged at the first end of the main boom body; and
   the right-side hinged hinge plate is mounted to the second adapter plate arranged at the second end of the main boom body;
when the pair of adapter arrangements is in the second mounting position,
   the left-side hinged hinge plate is mounted to the second adapter plate arranged at the second end of the main boom body; and
   the left-side hinged hinge plate is mounted to the first adapter plate arranged at the second end of the main boom body.

\* \* \* \* \*